(12) United States Patent
Burton et al.

(10) Patent No.: US 7,276,162 B2
(45) Date of Patent: Oct. 2, 2007

(54) REMOVAL OF CONTAMINANTS FROM A LIPOPHILIC FLUID

(75) Inventors: Dewey Edward Burton, Fairfield, OH (US); Arseni Valerevich Radomyselski, Loveland, OH (US); Paul Amaat Raymond Gerard France, West Chester, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 11/402,403

(22) Filed: Apr. 12, 2006

(65) Prior Publication Data

US 2006/0231477 A1 Oct. 19, 2006

Related U.S. Application Data

(63) Continuation-in-part of application No. 10/237,452, filed on Sep. 9, 2002, now abandoned.

(60) Provisional application No. 60/318,394, filed on Sep. 10, 2001.

(51) Int. Cl.
*B01D 15/00* (2006.01)

(52) U.S. Cl. ............... 210/502.1; 210/505; 502/402

(58) Field of Classification Search ........... 210/502.1, 210/503, 505; 502/402; 442/414
See application file for complete search history.

(56) References Cited

U.S. PATENT DOCUMENTS

| | | | |
|---|---|---|---|
| 3,327,859 A | 6/1967 | Pall | |
| 3,368,678 A | 2/1968 | Gilbert | |
| 3,395,086 A | 7/1968 | Victor | |
| 3,420,709 A | 1/1969 | Barrett et al. | |
| 3,692,467 A | 9/1972 | Durr et al. | |
| 3,839,176 A | 10/1974 | McCoy et al. | |
| 4,108,599 A | 8/1978 | Coll-Palagos et al. | |
| 4,645,567 A | 2/1987 | Hou et al. | |
| 4,664,754 A | 5/1987 | Caputi et al. | |
| 4,774,004 A | 9/1988 | Gruenewalder et al. | |
| 5,057,240 A | 10/1991 | Madore et al. | |
| 5,139,668 A | 8/1992 | Pan et al. | |
| 5,178,768 A | 1/1993 | White, Jr. | |
| 5,442,040 A | 8/1995 | Ou | |
| 5,882,506 A | 3/1999 | Ohsol et al. | |
| 6,059,845 A | 5/2000 | Berndt et al. | |
| 6,063,135 A | 5/2000 | Berndt et al. | |
| 6,086,635 A | 7/2000 | Berndt et al. | |
| 6,274,041 B1 | 8/2001 | Williamson et al. | |
| 6,310,029 B1 | 10/2001 | Kilgour et al. | |
| 6,312,476 B1 | 11/2001 | Perry et al. | |
| 6,313,079 B1 | 11/2001 | Murphy | |
| 6,368,359 B1 | 4/2002 | Perry et al. | |
| 6,914,040 B2 | 7/2005 | Deak et al. | |
| 6,930,079 B2 | 8/2005 | Deak et al. | |
| 2002/0017493 A1 | 2/2002 | Ehrensperger et al. | |
| 2002/0038480 A1 | 4/2002 | Deak et al. | |
| 2002/0184715 A1 | 12/2002 | Taylor | |
| 2003/0070238 A1 | 4/2003 | Radomyselski et al. | |

FOREIGN PATENT DOCUMENTS

| | | |
|---|---|---|
| DE | 3739711 | 6/1989 |
| DE | 44 10 142 A1 | 9/1995 |
| EP | 0 343 697 | 11/1989 |
| EP | 0841 362 | 5/1998 |
| GB | 1 204 353 | 9/1970 |
| JP | 57078500 A | 5/1982 |
| JP | 61-085995 | 5/1986 |
| WO | WO 01/06051 A1 | 1/2001 |
| WO | WO 01/27380 A1 | 4/2001 |
| WO | WO 01/34613 A1 | 5/2001 |
| WO | WO 01/44256 A1 | 6/2001 |
| WO | WO 01/94679 A2 | 12/2001 |
| WO | WO 02/077356 A2 | 10/2002 |

*Primary Examiner*—Matthew O. Savage
(74) *Attorney, Agent, or Firm*—Kim William Zerby; Steven W. Miller

(57) ABSTRACT

The present invention relates to processes for removing contaminants from lipophilic fluids, adsorbent materials employed in such processes, and lipophilic fluids produced by such processes.

2 Claims, No Drawings

REMOVAL OF CONTAMINANTS FROM A LIPOPHILIC FLUID

RELATED APPLICATIONS

This application is a continuation-in-part of prior patent application Ser. No. 10/237,452, filed on Sep. 9, 2002, now abandoned; which claims priority to U.S. Provisional Application Ser. No. 60/318,394 filed on Sep. 10, 2001.

FIELD OF THE INVENTION

The present invention relates to processes for removing contaminants from lipophilic fluids, adsorbent materials employed in such processes, and lipophilic fluids produced by such processes.

BACKGROUND OF THE INVENTION

Lipophilic fluids, such as dry cleaning solvents, may comprise contaminants and often times do comprise contaminants especially after fabric articles have been treated in the dry cleaning processes.

The presence of contaminants in a post-fabric article treatment lipophilic fluid is undesirable for various reasons, especially if re-use of the lipophilic fluid is desirable. One reason is that soils and/or other contaminants removed from the fabric article during the lipophilic fluid treatment could become commingled and/or associated with the contaminants, thus redeposition of the soils and/or other contaminants onto the fabric article or new fabric articles could potentially occur if the lipophilic fluid is reused prior to removing any contaminants.

Accordingly, there is a need for a process for removing and/or reducing contaminants from a lipophilic fluid.

SUMMARY OF THE INVENTION

The present invention fulfills the needs described above by providing processes for removing contaminants from lipophilic fluids, adsorbent materials employed in such processes, and lipophilic fluids produced by such processes.

During fabric treating processes utilizing lipophilic fluids, the lipophilic fluids typically end up containing contaminants, such as surfactants, dyes, soils such as lipstick, and lipids, such as triglycerides, fatty acids, squalene, water and/or other "non-lipophilic fluid materials". How the contaminants end up in the lipophilic fluid is not the focus of the present invention, rather the present invention focuses on removing and/or reducing the contaminants from the lipophilic fluids such that the lipophilic fluids are pure or substantially pure. In other words, such that the pure and/or substantially pure lipophilic fluids preferably comprise a level of the contaminants that does not impair the performance of the pure and/or substantially pure lipophilic fluid in subsequent steps of and/or new fabric treating processes. Preferably, the level of the contaminants present in the pure or substantially pure lipophilic fluid is from about 0% to about 1%, more preferably from about 0.00001% to about 0.1%, even more preferably from about 0.0001% to about 0.01% by weight of the lipophilic fluid.

In one aspect of the present invention, a process for removing a contaminant from a contaminant-containing lipophilic fluid comprising the step of contacting an adsorbent material comprising a charged agent with the contaminant-containing lipophilic fluid such that the contaminant is removed from the contaminant-containing lipophilic fluid by the adsorbent material, is provided.

In another aspect of the present invention, a process for removing a contaminant from a contaminant-containing lipophilic fluid, said process comprising the steps of:

a. contacting an adsorbent material comprising a charged agent with the contaminant-containing lipophilic fluid to produce a first eluent; and b. optionally, contacting an adsorbent material comprising a polar agent and/or apolar agent with the first eluent to produce a second eluent; and c. optionally, repeating step a and/or step b, at least once; and d. optionally, recovering the second eluent, is provided.

In still another aspect of the present invention, a process for removing a contaminant from a contaminant-containing lipophilic fluid comprising the steps of:

a. contacting an adsorbent material comprising a charged agent with the contaminant-containing lipophilic fluid to produce a first eluent; and b. contacting an adsorbent material comprising a polar agent and/or apolar agent with the first eluent to produce a second eluent; and c. recovering the second eluent;

d. contacting a fabric with the second eluent;

e. contacting the adsorbent material comprising the charged agent with an environmental condition such that residual lipophilic fluid present on the charged agent is released;

f. contacting the adsorbent material comprising the charged agent with a solvent such that the contaminant present on the charged agent is released; and g. contacting the adsorbent material comprising the charged agent with an environmental condition such that residual solvent present on the charged agent is released; and h. optionally, repeating any of steps a-g at least once, is provided.

In yet another aspect of the present invention, a continuous filtering cycle wherein an adsorbent material comprising a charged agent is repeatedly contacted with a contaminant-containing lipophilic fluid such that the adsorbent material removes the contaminant from the lipophilic fluid, is provided.

In still yet another aspect of the present invention, a process for removing a contaminant from a lipophilic fluid comprising:

a. contacting a charged agent having the formula:

wherein W is Si; Z is a charged substituent and T is a counterion; and b. optionally, contacting a silica gel embedded in activated carbon in sheet form, such that the contaminant is removed from the lipophilic fluid, is provided.

In even yet another aspect of the present invention, a contaminant-containing adsorbent material produced by a process according to the present invention is provided.

In yet another aspect of the present invention, a lipophilic fluid produced by a process according to the present invention is provided.

DETAILED DESCRIPTION OF THE INVENTION

Definitions

The term "fabric article" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "lipophilic fluid" used herein is intended to mean any nonaqueous fluid capable of removing sebum, as described in more detail herein below.

The term "cleaning composition" and/or "treating composition" used herein is intended to mean any lipophilic fluid-containing composition that comes into direct contact with fabric articles to be cleaned. It should be understood that the term encompasses uses other than cleaning, such as conditioning and sizing. Furthermore, optional cleaning adjuncts such as additional contaminants other than those contaminants described above, bleaches, and the like may be added to the "cleaning composition". That is, cleaning adjuncts may be optionally combined with the lipophilic fluid. These optional cleaning adjuncts are described in more detail herein below. Such cleaning adjuncts may be present in the cleaning compositions of the present invention at a level of from 0.01% to about 10% by weight of the cleaning composition.

The term "soil" means any undesirable substance on a fabric article that is desired to be removed. By the terms "water-based" or "hydrophilic" soils, it is meant that the soil comprised water at the time it first came in contact with the fabric article, or the soil retains a significant portion of water on the fabric article. Examples of water-based soils include, but are not limited to beverages, many food soils, water soluble dyes, bodily fluids such as sweat, urine or blood, outdoor soils such as grass stains and mud.

The term "capable of suspending water in a lipophilic fluid" means that a material is able to suspend, solvate or emulsify water, which is immiscible with the lipophilic fluid, in a way that the water remains visibly suspended, solvated or emulsified when left undisturbed for a period of at least five minutes after initial mixing of the components. In some examples of compositions in accordance with the present invention, the compositions may be colloidal in nature and/or appear milky. In other examples of compositions in accordance with the present invention, the compositions may be transparent.

The term "insoluble in a lipophilic fluid" means that when added to a lipophilic fluid, a material physically separates from the lipophilic fluid (i.e. settle-out, flocculate, float) within 5 minutes after addition, whereas a material that is "soluble in a lipophilic fluid" does not physically separate from the lipophilic fluid within 5 minutes after addition.

The term "consumable detergent composition" means any composition, that when combined with a lipophilic fluid, results in a cleaning composition according to the present invention.

The term "processing aid" refers to any material that renders the consumable detergent composition more suitable for formulation, stability, and/or dilution with a lipophilic fluid to form a cleaning composition in accordance with the present invention.

The term "mixing" as used herein means combining two or more materials (i.e., fluids, more specifically a lipophilic fluid and a consumable detergent composition) in such a way that a homogeneous mixture is formed. Suitable mixing processes are known in the art. Nonlimiting examples of suitable mixing processes include vortex mixing processes and static mixing processes.

Lipophilic Fluid

The lipophilic fluid herein is one having a liquid phase present under operating conditions of a fabric article treating appliance, in other words, during treatment of a fabric article in accordance with the present invention. In general such a lipophilic fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the lipophilic fluid is not a compressible gas such as carbon dioxide.

It is preferred that the lipophilic fluids herein be nonflammable or have relatively high flash points and/or low VOC (volatile organic compound) characteristics, these terms having their conventional meanings as used in the dry cleaning industry, to equal or, preferably, exceed the characteristics of known conventional dry cleaning fluids.

Moreover, suitable lipophilic fluids herein are readily flowable and nonviscous.

In general, lipophilic fluids herein are required to be fluids capable of at least partially dissolving sebum or body soil as defined in the test hereinafter. Mixtures of lipophilic fluid are also suitable, and provided that the requirements of the Lipophilic Fluid Test, as described below, are met, the lipophilic fluid can include any fraction of dry-cleaning solvents, especially newer types including fluorinated solvents, or perfluorinated amines. Some perfluorinated amines such as perfluorotributylamines while unsuitable for use as lipophilic fluid may be present as one of many possible adjuncts present in the lipophilic fluid-containing composition.

Other suitable lipophilic fluids include, but are not limited to, diol solvent systems e.g., higher diols such as C6- or C8- or higher diols, organosilicone solvents including both cyclic and acyclic types, and the like, and mixtures thereof.

A preferred group of nonaqueous lipophilic fluids suitable for incorporation as a major component of the compositions of the present invention include low-volatility nonfluorinated organics, silicones, especially those other than amino functional silicones, and mixtures thereof. Low volatility nonfluorinated organics include for example OLEAN® and other polyol esters, or certain relatively nonvolatile biodegradable mid-chain branched petroleum fractions.

Another preferred group of nonaqueous lipophilic fluids suitable for incorporation as a major component of the compositions of the present invention include, but are not limited to, glycol ethers, for example propylene glycol methyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol methyl ether, tripropylene glycol n-propyl ether, tripropylene glycol t-butyl ether, tripropylene glycol n-butyl ether. Suitable silicones for use as a major component, e.g., more than 50%, of the composition include cyclopentasiloxanes, sometimes termed "D5", and/or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Coming. Other suitable lipophilic fluids are commercially available from Procter & Gamble or from Dow Chemical and other suppliers.

Qualification of Lipophilic Fluid and Lipophilic Fluid Test (LF Test)

Any nonaqueous fluid that is both capable of meeting known requirements for a dry-cleaning fluid (e.g, flash point etc.) and is capable of at least partially dissolving sebum, as indicated by the test method described below, is suitable as a lipophilic fluid herein. As a general guideline, perfluorobutylamine (Fluorinert FC-43®) on its own (with or without adjuncts) is a reference material which by definition is unsuitable as a lipophilic fluid for use herein (it is essentially a nonsolvent) while cyclopentasiloxanes have suitable sebum-dissolving properties and dissolves sebum.

The following is the method for investigating and qualifying other materials, e.g., other low-viscosity, free-flowing silicones, for use as the lipophilic fluid. The method uses commercially available Crisco® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials, each vial will contain one type of lipophilic soil. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a clear single phase is formed in any of the vials containing lipophilic soils, then the nonaqueous fluid qualifies as suitable for use as a "lipophilic fluid" in accordance with the present invention. However, if two or more separate layers are formed in all three vials, then the amount of nonaqueous fluid dissolved in the oil phase will need to be further determined before rejecting or accepting the nonaqueous fluid as qualified.

In such a case, with a syringe, carefully extract a 200-microliter sample from each layer in each vial. The syringe-extracted layer samples are placed in GC auto sampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributylamine, i.e., Fluorinert FC-43 (fail) and cyclopentasiloxane (pass). A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat#1221131. The GC is suitably operated under the following conditions:

Carrier Gas: Hydrogen
Column Head Pressure: 9 psi
Flows: Column Flow @~1.5 ml/min.
Split Vent @~250-500 m/min.
Septum Purge @1 ml/min.
Injection: HP 7673 Autosampler, 10 ul syringe, 1 ul injection
Injector Temperature: 350° C.
Detector Temperature: 380° C. Oven Temperature Program: initial 60° C. hold 1 min.
rate 25° C./min.
final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage and/or fabric puckering profile and do not appreciably damage plastic buttons. Certain materials which in sebum removal qualify for use as lipophilic fluids, for example ethyl lactate, can be quite objectionable in their tendency to dissolve buttons, and if such a material is to be used in the compositions of the present invention, it will be formulated with water and/or other solvents such that the overall mix is not substantially damaging to buttons. Other lipophilic fluids, D5, for example, meet the garment care requirements quite admirably. Some suitable lipophilic fluids may be found in granted U.S. Pat. Nos. 5,865,852; 5,942,007; 6,042,617; 6,042,618; 6,056,789; 6,059,845; and 6,063,135, which are incorporated herein by reference.

Lipophilic fluids can include linear and cyclic polysiloxanes, hydrocarbons and chlorinated hydrocarbons, with the exception of PERC and DF2000 which are explicitly not covered by the lipophilic fluid definition as used herein. More preferred are the linear and cyclic polysiloxanes and hydrocarbons of the glycol ether, acetate ester, lactate ester families. Preferred lipophilic fluids include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

The level of lipophilic fluid, when present in the fabric article treating compositions according to the present invention, is preferably from about 70% to about 99.99%, more preferably from about 90% to about 99.9%, and even more preferably from about 95% to about 99.8% by weight of the fabric article treating composition.

The level of lipophilic fluid, when present in the consumable detergent compositions according to the present invention, is preferably from about 0.1% to about 90%, more preferably from about 0.5% to about 75%, and even more preferably from about 1% to about 50% by weight of the consumable detergent composition.

Lipophilic Fluid Adjuncts

During fabric treating processes utilizing lipophilic fluids, the lipophilic fluids typically end up containing contaminant components and/or contaminants, water and/or other "non-lipophilic fluid materials".

a. Contaminant Component

Contaminant components and/or conventional contaminants may become mixed with the lipophilic fluid as a result of a fabric treating process utilizing both materials or may be added to a lipophilic fluid prior to using the lipophilic fluid for a fabric treating process. How the contaminant component and/or conventional contaminant come to be present in the lipophilic fluid is not particularly important for the present invention. This present invention addresses the problem of removing the contaminant component and/or conventional contaminants from the lipophilic fluid.

Contaminant components (i.e., materials that have properties similar to contaminants) and conventional contaminants that may be present in the contaminant-containing lipophilic fluid of the present invention include, but are not limited to, conventional contaminants such as surfactants, dyes, lipids, soils, water, and other non-lipophilic fluid materials.

A wide range of conventional contaminants can be used as treating agents in the treating compositions of the present invention.

Nonlimiting examples of these other contaminants include conventional anionic, nonionic, cationic and zwitterionic contaminants.

Contaminants included in the treating compositions afforded by the present invention comprise at least 0.01%, preferably at least about 0.1%, more preferably at least about 0.5%, even more preferably at least about 1%, most preferably at least about 3% to about 80%, more preferably to about 60%, most preferably to about 50% by weight of composition depending upon the particular contaminants used and the desired effects to be achieved.

The contaminant can be nonionic, anionic, amphoteric, amphophilic, zwitterionic, cationic, semi-polar nonionic, and mixtures thereof, nonlimiting examples of which are disclosed in U.S. Pat. Nos. 5,707,950 and 5,576,282. A typical listing of anionic, nonionic, amphoteric and zwitterionic classes, and species of these contaminants, is given in U.S. Pat. No. 3,664,961 issued to Norris on May 23, 1972. Preferred compositions comprise nonionic contaminants and/or mixtures of nonionic contaminants with other contaminants, especially anionic contaminants.

Nonlimiting examples of contaminants useful herein include the conventional $C_8$-$C_{18}$ alkyl ethoxylates ("AE"), with EO about 1-22, including the so-called narrow peaked alkyl ethoxylates and $C_6$-$C_{12}$ alkyl phenol alkoxylates (especially ethoxylates and mixed ethoxy/propoxy), alkyl dialkyl amine oxide, alkanoyl glucose amide, $C_{11}$-$C_{18}$ alkyl benzene sulfonates and primary, secondary and random alkyl sulfates, the $C_{10}$-$C_{18}$ alkyl alkoxy sulfates, the $C_{10}$-$C_{18}$ alkyl polyglycosides and their corresponding sulfated polyglycosides, $C_{12}$-$C_{18}$ alpha-sulfonated fatty acid esters, $C_{12}$-$C_{18}$ alkyl and alkyl phenol alkoxylates (especially ethoxylates and mixed ethoxy/propoxy), $C_{12}$-$C_{18}$ betaines, schercotaines and sulfobetaines ("sultaines"), $C_{10}$-$C_{18}$ amine oxides, and the like. Other conventional useful contaminants are listed in standard texts.

The contaminant components and/or contaminants may include the following nonlimiting examples:
a) Anionic contaminants (e.g., alkyl or aryl sulfates, aerosol derivatives, etc)
b) Cationic or basic contaminants (e.g., quaternary contaminants, primary and secondary amines, etc.)
c) Non-ionic contaminants (e.g., Brij contaminants, Neodol contaminants, etc.) The contaminant component of the present invention is a material that is capable of suspending water in a lipophilic fluid and enhancing soil removal benefits of a lipophilic fluid. As a condition of their performance, said materials are soluble in the lipophilic fluid.

One class of materials can include siloxane-based surfactants (siloxane-based materials). The siloxane-based surfactants in this application may be siloxane polymers for other applications. The siloxane-based surfactants typically have a weight average molecular weight from 500 to 20,000. Such materials, derived from poly(dimethylsiloxane), are well known in the art. In the present invention, not all such siloxane-based surfactants are suitable, because they do not provide improved cleaning of soils compared to the level of cleaning provided by the lipophilic fluid itself.

Suitable siloxane-based surfactants comprise a polyether siloxane having the formula:

$$M_a D_b D'_c D''_d M'_{2-a}$$

wherein a is 0-2; b is 0-1000; c is 0-50; d is 0-50, provided that a+c+d is at least 1;

M is $R^1_{3-e}X_e SiO_{1/2}$ wherein $R^1$ is independently H, or a monovalent hydrocarbon group, X is hydroxyl group, and e is 0 or 1;

M' is $R^2_3 SiO_{1/2}$ wherein $R^2$ is independently H, a monovalent hydrocarbon group, or $(CH_2)_f$—$(C6H4)_g O$—$(C_2H_4O)_h$—$(C_3H_6O)_i$—$(C_kH_{2k}O)_j$—$R^3$, provided that at least one $R^2$ is $(CH_2)_f$—$(C6H4)_g O$—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1-10, g is 0 or 1, h is 1-50, i is 0-50, j is 0-50, k is 4-8;

D is $R^4_2 SiO_{2/2}$ wherein $R^4$ is independently H or a monovalent hydrocarbon group;

D' is $R^5_2 SiO_{2/2}$ wherein $R^5$ is independently $R^2$ provided that at least one $R^5$ is $(CH_2)_f$—$(C6H4)_g O$—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1-10, g is 0 or 1, h is 1-50, i is 0-50, j is 0-50, k is 4-8; and D" is $R^6_2 SiO_{2/2}$ wherein $R^6$ is independently H, a monovalent hydrocarbon group or $(CH_2)_l(C_6H_4)_m(A)_n$—$[(L)_o$—$(A')_p$—$]_q$—$(L')_r Z(G)_S$, wherein l is 1-10; m is 0 or 1; n is 0-5; o is 0-3; p is 0 or 1; q is 0-10; r is 0-3; s is 0-3; $C_6H_4$ is unsubstituted or substituted with a $C_{1-10}$ alkyl or alkenyl; A and A' are each independently a linking substituent representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' are each independently a $C_{1-30}$ straight chained or branched alkyl or alkenyl or an aryl which is unsubstituted or substituted; Z is a hydrogen, carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$alkyl or alkenyl, a carbohydrate unsubstituted or substituted with a $C_{1-10}$alkyl or alkenyl or an ammonium; G is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate.

Examples of the types of siloxane-based surfactants described herein above may be found in EP-1,043,443A1, EP-1,041,189 and WO-01/34,706 (all to GE Silicones) and U.S. Pat. Nos. 5,676,705, 5,683,977, 5,683,473, and EP-1,092,803A1 (all to Lever Brothers).

Nonlimiting commercially available examples of suitable siloxane-based surfactants are TSF 4446 (ex. General Electric Silicones), XS69-B5476 (ex. General Electric Silicones); Jenamine HSX (ex. DelCon) and Y12147 (ex. OSi Specialties).

A second preferred class of materials suitable for the surfactant component is organic in nature. Preferred materials are organosulfosuccinate surfactants, with carbon chains of from about 6 to about 20 carbon atoms. Most preferred are organosulfosuccinates containing dialkyl chains, each with carbon chains of from about 6 to about 20 carbon atoms. Also preferred are chains containing aryl or alkyl aryl, substituted or unsubstituted, branched or linear, saturated or unsaturated groups.

Nonlimiting commercially available examples of suitable organosulfosuccinate surfactants are available under the trade names of Aerosol OT and Aerosol TR-70 (ex. Cytec).

In one embodiment, the treating agent is insoluble in water. In another embodiment, the treating agent is insoluble in water, but soluble in a lipophilic fluid. In yet another embodiment, the treating agent is insoluble in water, soluble in a lipophilic fluid and has an HLB of from about 1 to about 9 or from about 1 to about 7 or from about 1 to about 5.

In still another embodiment, the treating agent is insoluble in water and insoluble in a lipophilic fluid. In still yet another embodiment, the treating agent in conjunction with a solubilizing agent is at least partially soluble in a lipophilic fluid and/or water. In the solubilizing agent embodiment, the treating agent is present at a level in the treating composition at from about 0.001% to about 5% or from about 0.001% to about 3% or from about 0.001% to about 1% by weight of the treating composition.

Nonlimiting examples of suitable treating agents include treating agents commercially available from Dow Corning under tradenames such as DC1248, SF1528 DC5225C and DCQ4 3667; and Silwets from Witco under tradenames such as L8620, L7210, L7220.

The contaminant component, when present in the contaminant-containing lipophilic fluid can be present at any level, typically the contaminant component is present at a level of from about 0.01% to about 10%, more preferably from about 0.02% to about 5%, even more preferably from about 0.05% to about 2% by weight of the contaminant-containing lipophilic fluid.

Another contaminant component/contaminant that may be present in the contaminant-containing lipophilic fluid is characterized as non-silicone additives. The non-silicone additives preferably comprise a strongly polar and/or hydrogen-bonding head group. Examples of the strongly polar and/or hydrogen-bonding head group are alcohols, carboxylic acids, sulfates, sulphonates, phosphates, phosphonates, and nitrogen containing materials. Preferred non-silicone additives are nitrogen containing materials selected from the group consisting of primary, secondary and tertiary amines, diamines, triamines, ethoxylated amines, amine oxides, amides, betaines (nonlimiting examples of betaines are Schercotaine materials commercially available from Scher Chemicals), cationic materials such as cationic surfactants and/or quaternary surfactants and/or quaternary ammonium salts such as ammonium chlorides (nonlimiting examples of ammonium chlorides are Arquad materials commercially available from Akzo Nobel and/or Varisoft materials from Goldschmidt) and cationic fabric softening actives, nonionic materials such as nonionic surfactants (i.e., alcohol ethoxylates, polyhydroxy fatty acid amides), gemini surfactants, anionic surfactants, zwitterionic surfactants and mixtures thereof. Alkylamines are particularly preferred. Additionally, branching on the alkyl chain to help lower the melting point is highly preferred. Even more preferred are primary alkylamines comprising from about 6 to about 22 carbon atoms.

Particularly preferred primary alkylamines are oleylamine (commercially available from Akzo under the trade name Armeen OLD), dodecylamine (commercially available from Akzo under the trade name Armeen 12D), branched $C_{16}$-$C_{22}$ alkylamine (commercially available from Rohm & Haas under the trade name Primene JM-T) and mixtures thereof.

In another embodiment, the contaminant-containing lipophilic fluid comprises a contaminant selected from the group consisting of anionic contaminants, cationic contaminants, nonionic contaminants, zwitterionic contaminants and mixtures thereof.

The non-silicone additives, when present in the treating compositions of the present invention, preferably comprises from about 0.01% to about 10%, more preferably from about 0.02% to about 5%, even more preferably from about 0.05% to about 2% by weight of the treating composition.

Polar Solvent

The contaminant-containing lipophilic fluid of the present invention may comprise a polar solvent. Non-limiting examples of polar solvents include: water, alcohols, glycols, polyglycols, ethers, carbonates, dibasic esters, ketones, other oxygenated solvents, and mixtures thereof. Further examples of alcohols include: C1-C126 alcohols, such as propanol, ethanol, isopropyl alcohol, etc., benzyl alcohol, and diols such as 1,2-hexanediol. The Dowanol series by Dow Chemical are examples of glycols and polyglycols useful in the present invention, such as Dowanol TPM, TPnP, DPnB, DPnP, TPnB, PPh, DPM, DPMA, DB, and others. Further examples include propylene glycol, butylene glycol, polybutylene glycol and more hydrophobic glycols. Examples of carbonate solvents are ethylene, propylene and butylene carbonantes such as those available under the Jeffsol tradename. Polar solvents for the present invention can be further identified through their dispersive ($\delta_D$), polar ($\delta_P$) and hydrogen bonding ($\delta_H$) Hansen solubility parameters. Preferred polar solvents or polar solvent mixtures have fractional polar ($f_P$) and fractional hydrogen bonding ($f_H$) values of $f_P > 0.02$ and $f_H > 0.10$, where $f_P = \delta_P/(\delta_D + \delta_P + \delta_H)$ and $f_H=\delta_H/(\delta_D+\delta_P+\delta_H)$, more preferably $f_P>0.05$ and $f_H>0.20$, and most preferably $f_P>0.07$ and $f_H>0.30$.

Polar solvent may be present in the contaminant-containing lipophilic fluid at any level, typically it is present in the contaminant-containing lipophilic fluid at a level of from about 0.001% to about 10%, more preferably from about 0.005% to about 5%, even more preferably from about 0.01% to about 1% by weight of the contaminant-containing lipophilic fluid.

In one embodiment, the contaminant-containing lipophilic fluid comprises from about 0% to about 5% or from about 0% to about 3% or from about 0.0001% to about 1% by weight of the contaminant-containing lipophilic fluid of a polar solvent.

In the treating composition of the present invention, the levels of polar solvent can be from about 0 to about 70%, preferably 1 to 50%, even more preferably 1 to 30% by weight of the detergent composition.

Adsorbent Material

The adsorbent material useful in the processes of the present invention comprises a polar agent and an apolar agent. Typically, the polar agents and apolar agents are present in the adsorbent material at a ratio of from about 1:10 to about 10:1 or from about 1:5 to about 5:1 or from about 1:2 to about 3:1.

In one embodiment, the adsorbent material has a surface area of from about 10 $m^2$/gram to about 1000 $m^2$/gram or from about 100 $m^2$/gram to about 1000 $m^2$/gram or from about 250 $m^2$/gram to about 1000 $m^2$/gram or even about 500 $m^2$/gram to about 1000 $m^2$/gram.

In one embodiment, the adsorbent material has an average particle size of from about 0.1 μm to about 250 μm.

In another embodiment, the adsorbent material has an average particle size of from about 0.1 μm to about 500 μm.

In another embodiment, the adsorbent material comprises a polar and apolar agent and another agent selected from the group consisting of: a polar agent, an apolar agent and optionally, a charged agent, wherein two or more agents are in the form of commingled agents in a unitary physical form.

In yet another embodiment, the adsorbent material comprises a polar and apolar agent and another agent selected from the group consisting of: a polar agent, an apolar agent and optionally, a charged agent, wherein two or more agents are in the form of layered agents.

In still another embodiment, the adsorbent material comprises a separate, discrete polar and/or apolar agent and a separate, discrete charged agent, such that the contaminant-containing lipophilic fluid contacts both the separate, discrete agents.

In still yet another embodiment, the adsorbent material comprises discrete particles.

In even still another embodiment, the adsorbent material is in the form of discrete particles.

Alternatively, the adsorbent material is in the form of a fibrous structure. Typically the fibrous structure is a non-woven fibrous structure. However, it could be a woven fibrous structure.

In another embodiment, the adsorbent material is in the form of discrete particles that are embedded in and/or coated on and/or impregnated in and/or bound to a fibrous structure.

The adsorbent material may comprise (1) charged agents and (2) polar and apolar agents commingled together. The polar agents can be in the form of discrete particles and the apolar agents can be in the form of a fibrous structure, wherein the discrete particle polar agents are embedded in and/or coated on and/or impregnated in and/or bound to a fibrous structure, typically a non-woven fibrous structure.

a. Polar Agents

In one embodiment, a polar agent useful in the adsorbent material of the present invention has the formula:

wherein Y is Si, Al, Ti, P; a is from about 1 to about 5; b is from about 1 to about 10; and X is a metal, such as alkaline or alkaline earth metals.

In another embodiment, a polar agent suitable for use in the adsorbent material of the present invention is selected from the group consisting of: silica, diatomaceous earth, aluminosilicates, polyamide resin, alumina, hydrogels, zeolites and mixtures thereof. Preferably, the polar agent is silica, more specifically silica gel.

Nonlimiting examples of monomers that comprise the hydrogels of the present invention include hydroxyalkyl acrylates, hydroxyalkyl methacrylates, N-substituted acrylamides, N-substituted methacrylamides, N-vinyl-2-pyrrolidone, N-acroylpyrrolidone, acrylics, methacrylics, vinyl acetate, acrylonitrile, styrene, acrylic acid, methacrylic acid, crotonic acid, sodium styrene sulfonate, sodium 2-sulfoxyethyl methacrylate, 2-acrylamido-2-methylpropanesulfonic acid, vinylpyridine, aminoethyl methacrylates, 2-methacryloyloxytritnethylammonium chloride, N,N'-methylenebisacrylamide, poly(ethylene glycol) dimethacrylate, 2,2'-(p-phenylenedioxy diethyl dimethacrylate, divinylbenzene and triallylamine.

In yet another embodiment, a polar agent suitable for use in the adsorbent material of the present invention has an average particle size of from about 0.5 μm to about 500 μm.

b. Apolar Agents

Apolar agents suitable for use in the adsorbent material of the present invention comprise one or more of the following: activated carbon, polystyrene, polyethylene, and/or polydivinyl benzene. The activated carbon may be in powdered form and/or has a surface area of from about 50 $m^2$/gram to about 200 $m^2$/gram, typically it's around about 75 $m^2$/gram to about 125 $m^2$/gram.

c. Charged Agents

In one embodiment, the charged agent is selected from the group consisting of: anionic materials, cationic materials, zwitterionic materials and mixtures thereof.

In another embodiment, the charged agent has the formula:

wherein W is Si, Al, Ti, P, or a polymer backbone; Z is a charged substituent and T is a counterion selected from alkaline, alkaline earth metals and mixtures thereof, such as sodium or potassium, ammonium, alkylammonium derivatives, hydrogen ion; chloride, hydroxide, fluoride, iodide, carboxylate, and mixtures thereof.

The polymer backbone is typically comprises a material selected from the group consisting of: polystyrene, polyethylene, polydivinyl benzene, polyacrylic acid, polyacrylamide, polysaccharide, polyvinyl alcohol, copolymers of these and mixtures thereof.

The charged substituent typically comprises cationic or anionic moieties, such as sulfonates, phosphates, carboxylates, quaternary ammonium and mixtures thereof.

In another embodiment, the charged agent may have the formula: [W-Z], wherein W is Si, Al, Ti, P, or a polymer backbone; Z is a charged substituent comprising zwitterionic moieties that can become charged by, for example, pH change or addition of salts. Exemplary zwitterionic moieties include alcohols; diols; primary and secondary amines, and mixtures thereof. It is understood that when the zwitterionic substituent becomes charged, the charged agent may comprise a counterion T such as those described hereinabove.

The W typically comprises from about 1% to about 15% by weight of the charged agent.

In another embodiment, the charged agent is capable of regeneration such that the charged agent can release any contaminant that it temporarily removes from the contaminant-containing lipophilic fluid upon being exposed to an environmental condition. An "environmental condition" as used herein means any physical or chemical condition that causes the charged agent to release the contaminant. Non-limiting examples of environmental conditions include exposing the charged agent to an acid, a base and/or a salt. The charged agents that are capable of regeneration typically exhibit a $pK_a$ or $pK_b$ of from about 2 to about 8. Charged agents that are capable of regeneration can be reused for multi-cycle contaminant removal from lipophilic fluids.

Processes of the Present Invention

To facilitate removal of the contaminant from the contaminant-containing lipophilic fluid, it is desirable to wet the adsorbent material with a wetting agent prior to the contaminant-containing lipophilic fluid contacting the adsorbent material. Typically, the wetting agent comprises a lipophilic fluid.

In one embodiment, a process for removing a contaminant from a contaminant-containing lipophilic fluid comprise the steps of:
  a. contacting an adsorbent material comprising a charged agent with the contaminant-containing lipophilic fluid to produce a first eluent; and
  b. optionally, contacting an adsorbent material comprising a polar agent and/or apolar agent with the first eluent to produce a second eluent; and
  c. optionally, repeating step a and/or step b, at least once; and
  d. optionally, recovering the second eluent.

The process may further comprise the step of:
  e. contacting a fabric with the second eluent.

Likewise, the process may further comprise the step of:
  f. contacting the adsorbent material comprising the charged agent with an environmental condition such that residual lipophilic fluid present on the charged agent is released. The environmental condition is typically selected from the group consisting of exposing the charged agent to heat, vacuum, application of a mechanical force and mixtures thereof.

The process may further comprise the step of:
  g. contacting the adsorbent material comprising the charged agent with a solvent such that the contaminant present on the charged agent is released. The contaminant may be discarded at this time. The solvent typically comprises a polar solvent having a pH of from about 2 to about 8 and/or an ionic strength of between about 0.01 to about 60. Nonlimiting examples of suitable solvents include water and/or alcohols.

The process may further comprise the step of:
  h. contacting the adsorbent material comprising the charged agent agent with an environmental condition such that residual solvent present on the charged agent is released. The environmental condition is typically selected from the group consisting of heat, vacuum, application of a mechanical force and mixtures thereof.

In another embodiment, a process for removing a contaminant from a contaminant-containing lipophilic fluid comprising the steps of:
  a. contacting an adsorbent material comprising a charged agent with the contaminant-containing lipophilic fluid to produce a first eluent; and
  b. contacting an adsorbent material comprising a polar agent and/or apolar agent with the first eluent to produce a second eluent; and
  c. recovering the second eluent;
  d. contacting a fabric with the second eluent;
  e. contacting the adsorbent material comprising the charged agent with an environmental condition such that residual lipophilic fluid present on the charged agent is released;
  f. contacting the adsorbent material comprising the charged agent with a solvent such that the contaminant present on the charged agent is released; and
  g. contacting the adsorbent material comprising the charged agent with an environmental condition such that residual solvent present on the charged agent is released; and
  h. optionally, repeating any of steps a-g at least once.

In yet another embodiment, a continuous filtering cycle wherein an adsorbent material comprising a charged agent is repeatedly contacted with a contaminant-containing lipophilic fluid such that the adsorbent material removes the contaminant from the lipophilic fluid, is provided. The charged agent present in the continuous filtering cycle may be exposed to an environmental condition such that the contaminant is released from the adsorbent material. Typically, the environmental condition in this embodiment comprises exposing the charged agent to acids, bases and/or salts.

In still another embodiment, a process for removing a contaminant from a lipophilic fluid comprising:
  a. contacting a charged agent having the formula:

[W-Z]T wherein W is Si; Z is a charged substituent selected from carboxylates, primary amines and mixtures thereof; and T is a counterion selected from alkaline, alkaline earth metals and mixtures thereof; and
  b. optionally, contacting a silica gel embedded in activated carbon in sheet form, such that the contaminant is removed from the lipophilic fluid, is provided.

Different techniques known to those skilled in the art for facilitating filtering of the lipophilic fluid may be used. For example, the contaminant-containing lipophilic fluid may contact the adsorbent material under vacuum.

In one embodiment of a filtering process in accordance with the present invention, the contaminant-containing lipophilic fluid is introduced into a filter cartridge containing a primary adsorbent and a secondary adsorbent. The primary adsorbent is the polar adsorbent material (silica, diatomaceous earth, etc.). After contacting the polar adsorbent material, polar contaminants are removed from the lipophilic fluid. The lipophilic fluid then passes through a frit and contacts a secondary adsorbent material. The secondary adsorbent material is the apolar adsorbent (e.g., activated carbon, etc.). The secondary adsorbent material removes any remaining contaminants from the lipophilic fluid. The lipophilic fluid exits the cartridge and is available for reuse.

In another embodiment, the primary and secondary adsorbent materials described above are contained in separate cartridges connected by tubing. Lipophilic fluid is passed through the two cartridges such that the primary adsorbent material is contacted by the contaminant-containing lipophilic fluid prior to the contaminant-containing lipophilic fluid contacting the secondary adsorbent material. The lipophilic fluid exits the second cartridge (the secondary adsorbent material cartridge) and is available for reuse.

The results of practicing the processes of the present invention result in a contaminant-containing adsorbent material being produced by the processes according to the present invention.

Lipophilic fluids resulting from the processes of the present invention are within the scope of the present invention

What is claimed is:

1. A fibrous filter for removing a contaminant from a lipophilic fluid, said filter comprising a first adsorbent material consisting of a polar agent which is a polyamide resin and an apolar agent selected from the group consisting of polystyrene, polyethylene, polydivinylbenzene and mixtures thereof and a second adsorbent material comprising a charged agent selected from the group consisting of materials having a polymer backbone, said backbone having a charged substituent selected from the group consisting of sulfonates, phosphates, carboxylates, alcohols, primary amines, secondary amines, and mixture thereof.

2. The filter according to claim 1 wherein the polymer backbone comprises polystyrene, polyethylene, polydivinyl benzene, polyacrylic acid, polyacrylamide, polysaccharide, polyvinyl alcohol, copolymers of these and mixtures thereof.

* * * * *

UNITED STATES PATENT AND TRADEMARK OFFICE
CERTIFICATE OF CORRECTION

PATENT NO. : 7,276,162 B2 Page 1 of 1
APPLICATION NO. : 11/402403
DATED : October 2, 2007
INVENTOR(S) : Burton et al.

It is certified that error appears in the above-identified patent and that said Letters Patent is hereby corrected as shown below:

<u>Column 5</u>

Line 4, delete "Coming" and insert -- Corning --.

<u>Column 6</u>

Line 4, delete "m/min." and insert -- ml/min. --.

<u>Column 12</u>

Lines 24-25, delete "2-methacryloyloxytritnethylammonium" and insert

-- 2-methacryloyloxytrimethylammonium --.

Signed and Sealed this

Twenty-ninth Day of April, 2008

JON W. DUDAS
*Director of the United States Patent and Trademark Office*